United States Patent
Ridgeway

(10) Patent No.: US 10,625,412 B2
(45) Date of Patent: Apr. 21, 2020

(54) WING MAJORS ENTRY AND EXIT AID

(71) Applicant: The Boeing Company, Chicago, IL (US)

(72) Inventor: Andrea L. Ridgeway, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 10 days.

(21) Appl. No.: 15/926,941

(22) Filed: Mar. 20, 2018

(65) Prior Publication Data
US 2019/0291265 A1   Sep. 26, 2019

(51) Int. Cl.
*B25H 5/00* (2006.01)
*B64F 5/10* (2017.01)

(52) U.S. Cl.
CPC . *B25H 5/00* (2013.01); *B64F 5/10* (2017.01)

(58) Field of Classification Search
CPC ............................ A47C 20/026; A61G 13/122
USPC ..... 248/118, 118.1, 118.3, 118.5, 544; 5/630
See application file for complete search history.

(56) References Cited

U.S. PATENT DOCUMENTS

| | | | | | |
|---|---|---|---|---|---|
| 2,724,133 | A | * | 11/1955 | Sorrell | B63C 9/30 441/127 |
| 5,149,033 | A | * | 9/1992 | Burzler | A61G 7/0755 248/118 |
| 5,224,956 | A | * | 7/1993 | Dumas | A61G 7/07 606/240 |
| 5,390,682 | A | * | 2/1995 | Iams | A47G 9/10 5/632 |
| 6,065,166 | A | * | 5/2000 | Sharrock | A61G 7/065 5/630 |

* cited by examiner

*Primary Examiner* — Steven M Marsh
(74) *Attorney, Agent, or Firm* — Felix L. Fischer

(57) ABSTRACT

An ergonomic aid has a base portion configured to be received on a stringer adjacent an access port in a partition wall within a structural enclosure. A support pad extends from the base portion, the support pad having an upper surface with a contour adapted to match a profile of the access port. The support pad has a predetermined height to extend the upper surface above a rim of the access port opening when the support pad is in a compressed condition.

20 Claims, 9 Drawing Sheets

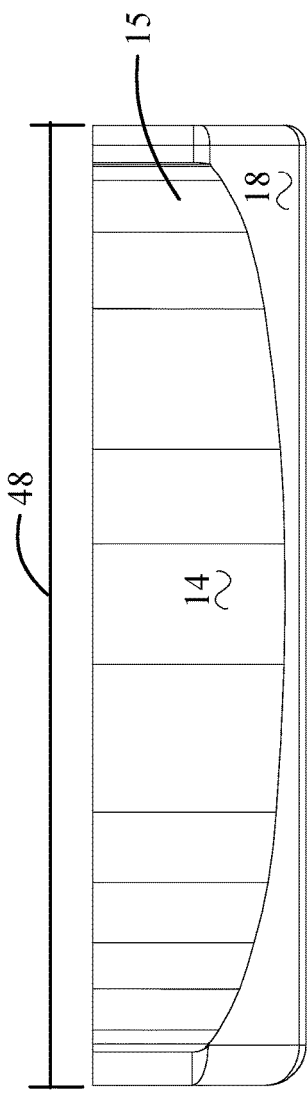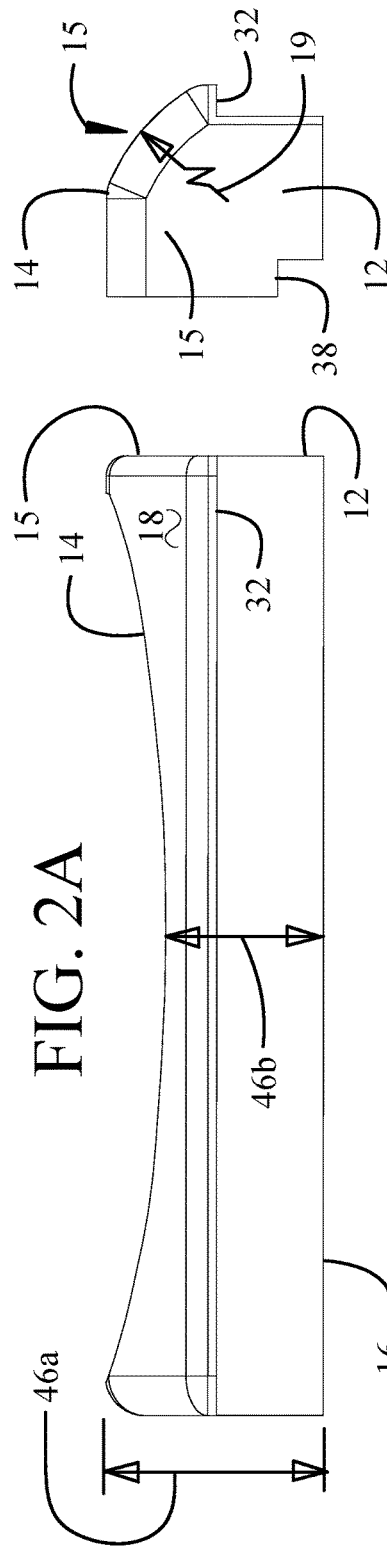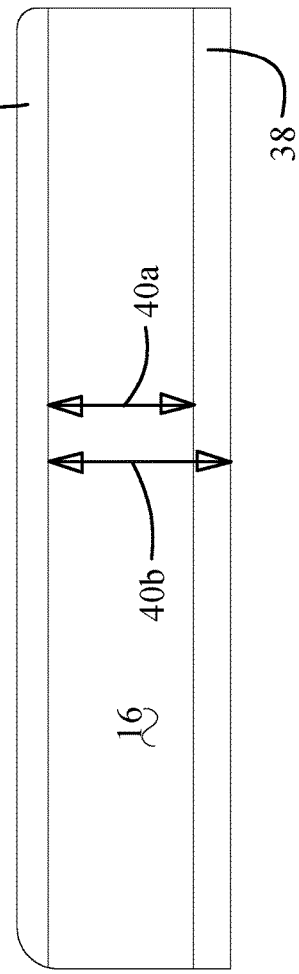

WING MAJORS ENTRY AND EXIT AID

BACKGROUND INFORMATION

Field

Implementations shown in the disclosure relate generally to ergonomic support padding for technicians/mechanics and more particularly to an ergonomic aid having a support pad extending from a base configured to be received between stringer flanges, the base elevating the pad to an access port opening and the pad contoured to conform to the access port profile.

Background

During manufacturing and maintenance of large commercial aircraft, mechanics are required to work inside constricted bays internal to wing fuel tank structures and similar environments. Access to such environments is typically through one or more access ports. Prior art solutions typically employ padding extending through the access port or saddled on the lip of the access port with no solid base support which makes the padding element unstable. Such "saddle pads" also reduced the size of the wing access port which was already highly restrictive and sized to admit entrance of approximately half of the in-tank certified mechanics.

SUMMARY

Exemplary implementations provide an ergonomic aid having a base portion configured to be received on a stringer adjacent an access port in a partition wall within a structural enclosure. A support pad extends from the base portion, and has an upper surface with a contour configured to match a profile of the access port said support pad having a predetermined height matching the upper surface with a rim of the access port opening when the support pad is in a compressed condition.

The exemplary implementations allow a method for installation and use of an ergonomic aid for access port passthrough wherein an ergonomic aid is inserted on a stringer. A web on the stringer is engaged with a bottom surface of a base portion. An arcuately contoured upper surface of a support pad extending from the base portion is aligned with a lower periphery of a rim profile of an access port.

BRIEF DESCRIPTION OF THE DRAWINGS

The features, functions, and advantages that have been discussed can be achieved independently in various implementations or may be combined in yet other implementations further details of which can be seen with reference to the following description and drawings.

FIGS. 2A-2D are top, front, bottom and side views of the first implementation;

DETAILED DESCRIPTION

The exemplary implementations described herein provide an ergonomic aid with a support pad extending from a base portion that is received on the web of a stringer adjacent an access port in a partition wall such as a fuel tank within a wing structure. The support pad has an arcuate upper surface contoured to match the profile of the access port lower rim. The support pad may have a lip which overlaps a front flange on the stringer with the base portion resting on the web of the stringer. The base portion may have cutouts or reliefs to accommodate rear flanges or other structural features of the stringer to allow secure placement of the ergonomic pad. The support pad has a width of at least 10 inches to provide adequate support for a mechanic during ingress and egress through the access port.

Figure 1:
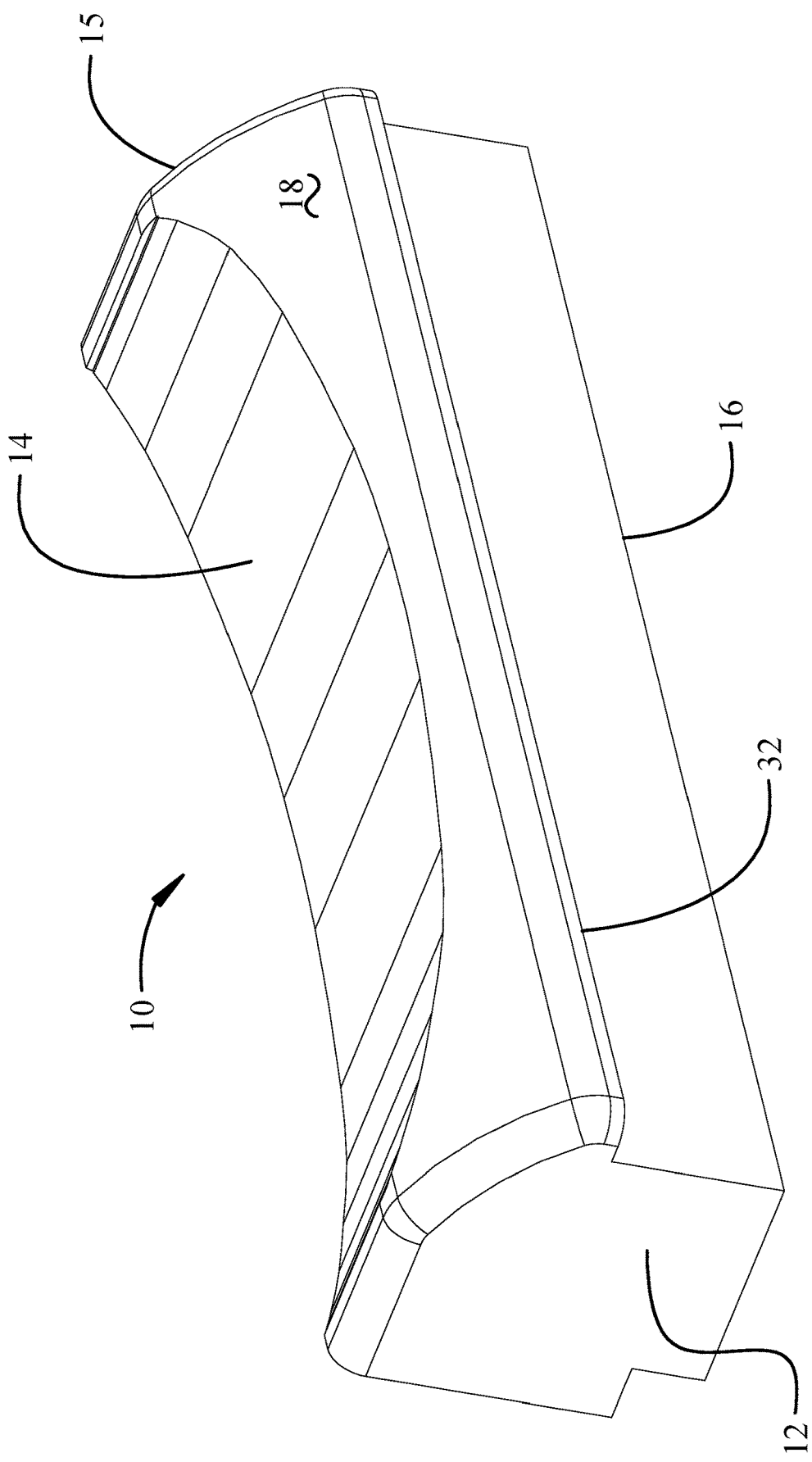
FIG. 1 is a pictorial representation of a first implementation showing general configuration of the based and pad.
Figure 3:
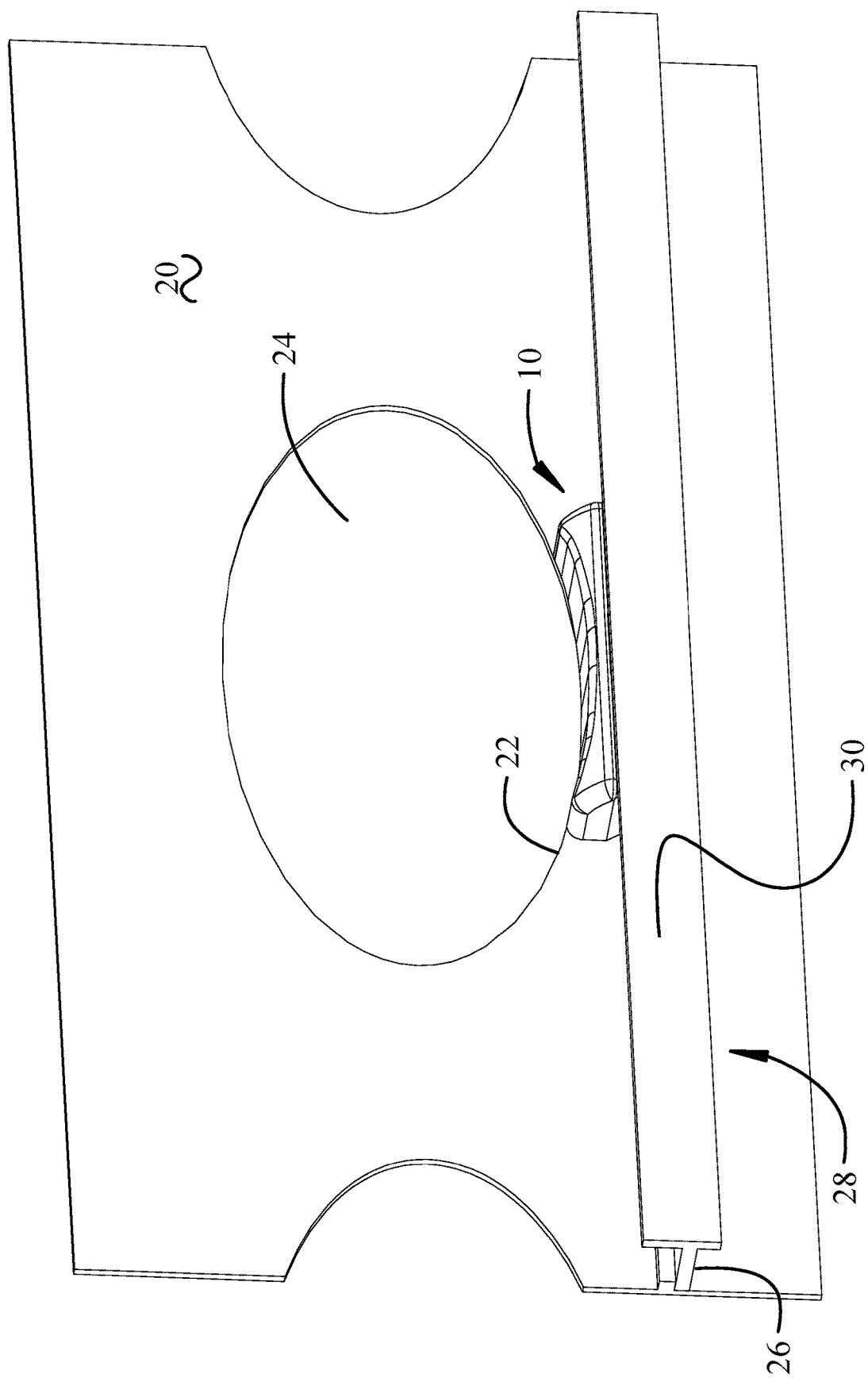
FIG. 3 is a pictorial view of the first implementation as operably placed for use.
Figure 4:
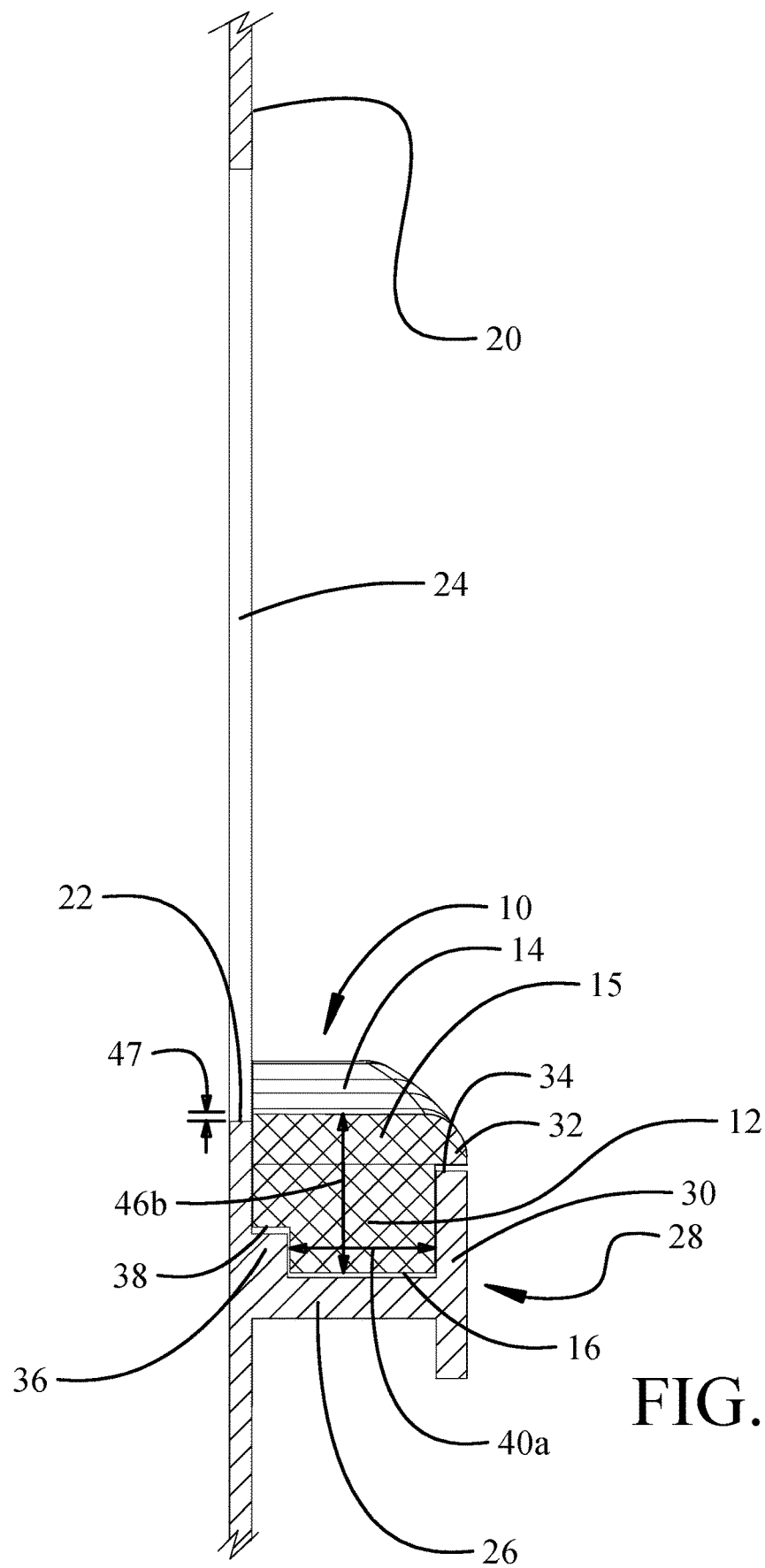
FIG. 4 is a side section view of the first implementation and receiving structure.

Referring to the drawings, FIG. 1 shows a first implementation of an ergonomic aid 10 which is shown in detail in FIGS. 2A-2D. A base portion 12 is configured to engage a structure such as a partition 20 between fuel tank cells in a large commercial aircraft, as seen in FIG. 3, on which the ergonomic aid 10 will be employed. An upper surface 14 of a support pad 15, extending from the base portion 12, has an arcuate contour configured to match a rim profile 22 of a lower periphery of an access port 24 and provides a comfortable curved surface to support the back (or abdomen) of a mechanic using the ergonomic aid 10 for support while horizontally disposed within or passing through the access port 24. A bottom surface 16 of the base portion 12 rests on a web 26 of a stringer 28 protruding from or attached to the partition 20. For the implementation as shown, a front portion 18 of the support pad 15 has a radius 19 of nominally 1.75 to 2.0 inches to facilitate sliding contact by a mechanic with the upper surface 14 of the support pad 15 while engaging pad during ingress or egress through the access port 24.

In many cases, the stringer 28 will have at least an end flange 30 substantially perpendicular to the web 26. The support pad 15, in the implementation as shown, has a front lip 32 extending beyond a front surface 13 of the base portion 12 configured to engage a top edge 34 of the end flange 30 providing not only addition comfort for the mechanic by avoiding potential contact with the flange but assistance in locking the ergonomic aid 10 in place on the stringer 28. For the implementation shown, the front lip 32 has a depth at least covering the top edge 34. For the exemplary implementation, stringer 28 additionally has a base flange 36. Base portion 12 incorporates a relief 38 to receive the base flange 36. Relief 38 also provides additional assistance in locking the ergonomic aid 10 in place on the stringer 28. A thickness 40a, 40b of the base portion 12 may be predetermined to cause frictional engagement (and possible slight compression) between a front surface 42 of the base portion 12 and the end flange 30 of the stringer 28 and the relief 38 and the base flange 36, if present, and/or a rear surface 44 of the base portion 12 and the partition 20.

A height of the upper surface 14 of the ergonomic aid 10, varying from a lateral height 46a to a central height 46b over the arcuate contour, is predetermined to provide, in an uncompressed condition, a least a minimum of 0.25 inches in vertical clearance 47 above the rim profile 22 of the access port 24 to allow the support pad in a compressed condition to be at least equal in height to the lower periphery of access port 24 above the web 26 of stringer 28 on which the ergonomic aid 10 rests. This prevents pain or injury to the mechanic and avoids damage to the rim profile of the access port. A width 48 of the support pad 15 is at least 10 inches to provide adequate support for the back or abdomen of a mechanic employing the ergonomic aid 10. The combined curvature and compressibility of the upper surface prevent the ergonomic aid 10 from reducing the vertical height or the horizontal width or overall dimensions of the access port opening when in use.

Figure 5:
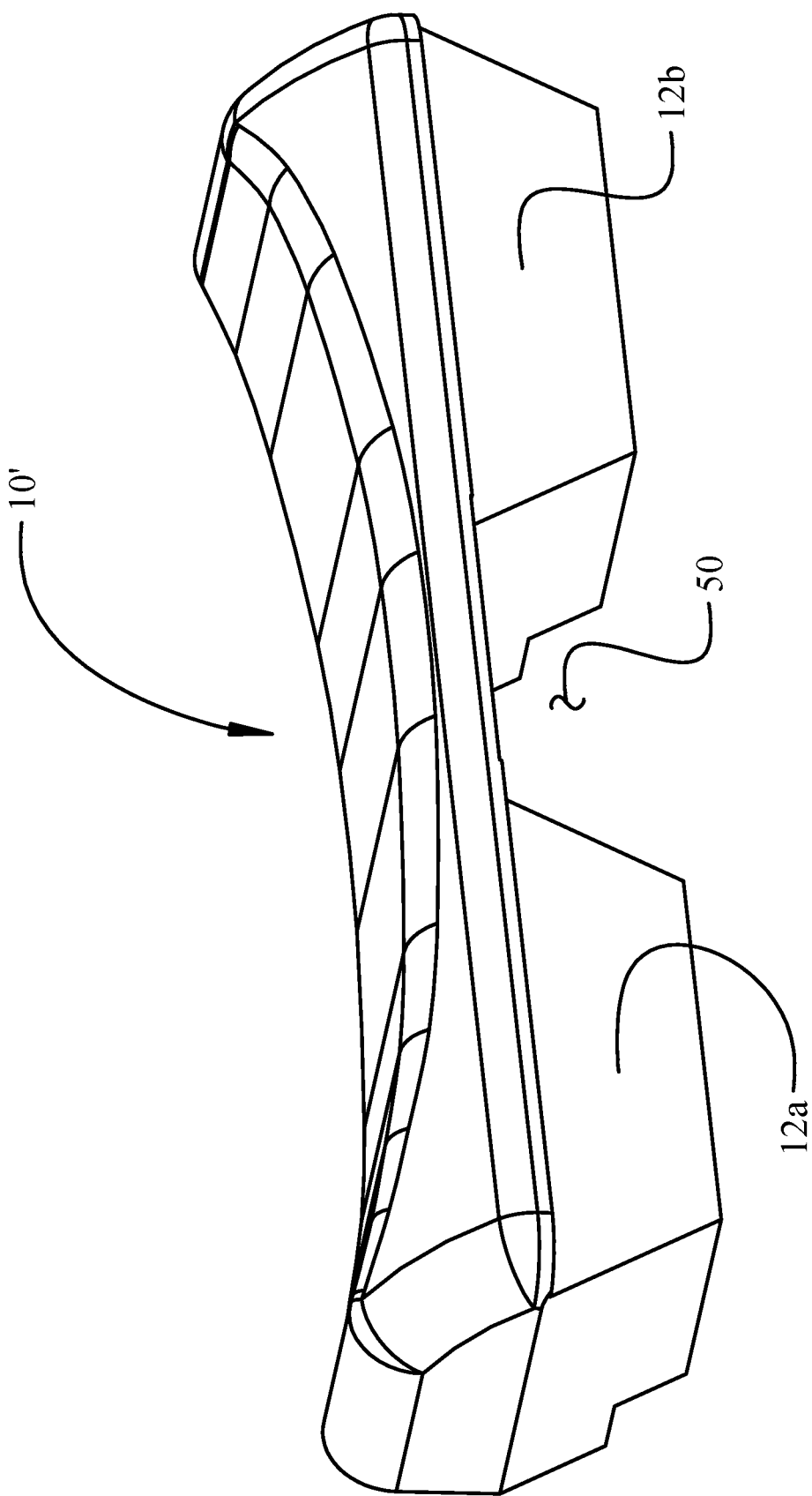
FIG. 5 is a pictorial representation of a second implementation showing an alternative configuration of the base and pad.
Figure 6B:
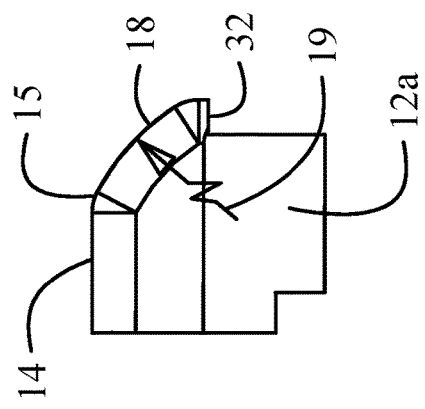
FIGS. 6A-6C are front, side and bottom views of the second implementation.
Figure 6A:
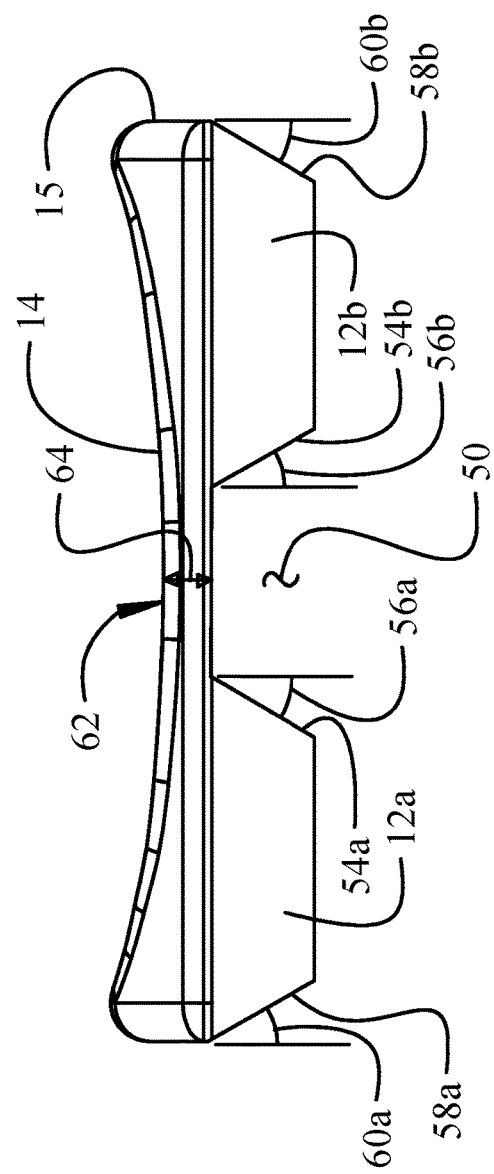
Figure 6C:
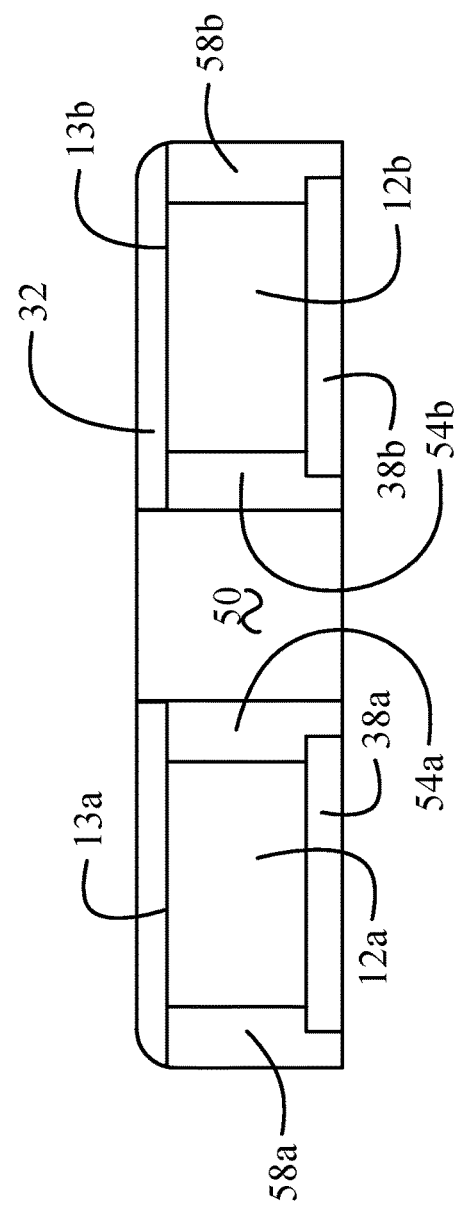
Figure 7:
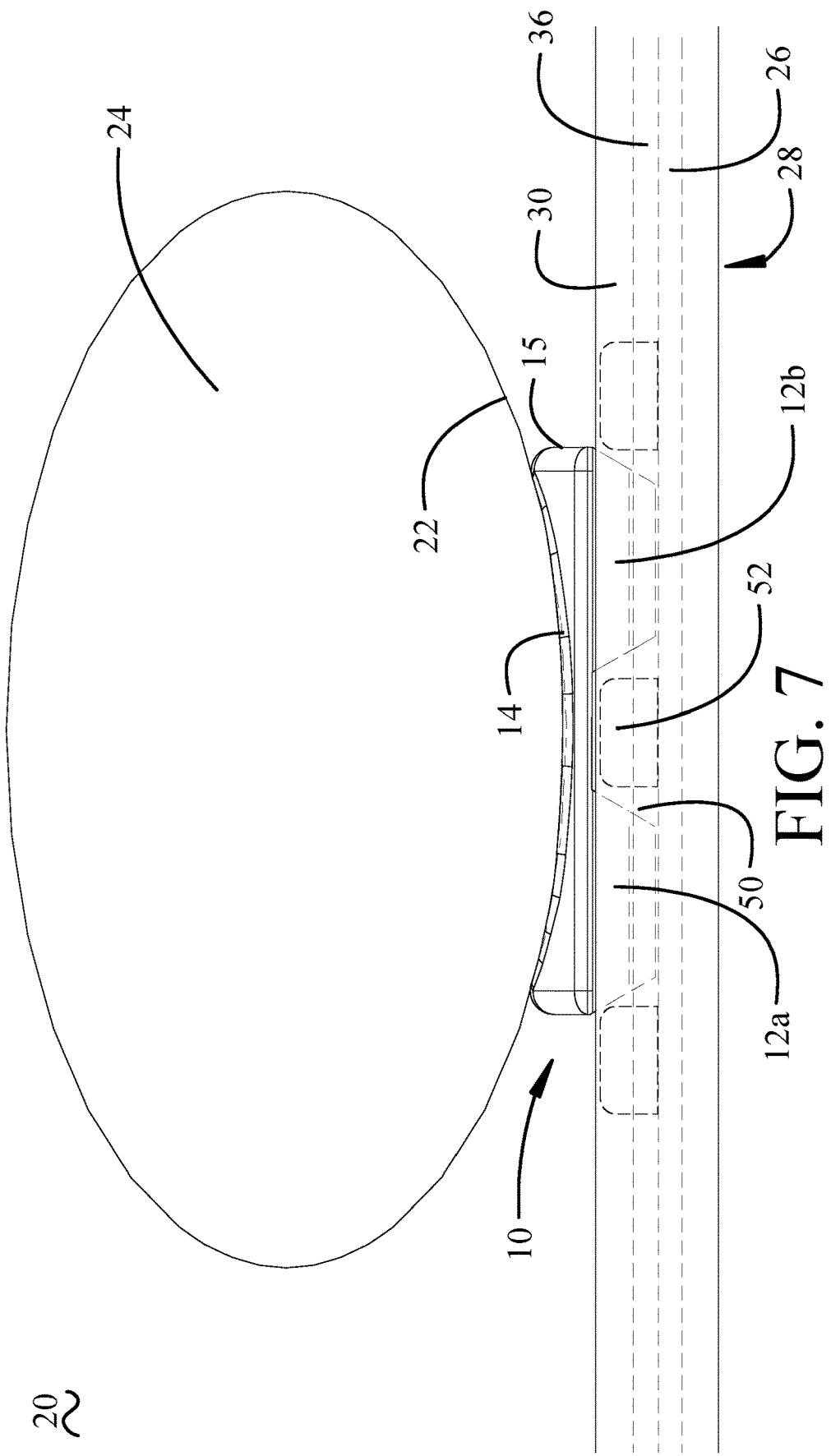
FIG. 7 is a front hidden line view of the second implementation as operably placed for use.

The stringer 28 and/or partition 20 may have protruding features adjacent the access port 24. A second implementation of an ergonomic aid 10' is shown in FIG. 5 and in detail in FIGS. 6A-6C. The base portion of the ergonomic aid 10' has two base portions 12a and 12b spaced apart to create an intervening channel 50. The base portions 12a and 12b engage stringer 28 and partition 20 as seen in FIG. 7. The support pad 15 extends from the base portions 12a and 12b and the upper surface 14, as in the first implementation, is curved to provide a contour matching the rim profile 22 of the access port 24. Bottom surfaces 16a and 16b of the base portions 12a and 12b, respectively, rest on the web 26 of a stringer 28. As in the first implementation, a front portion 18 of the support pad 15 has a radius 19 to facilitate sliding contact by a mechanic with the upper surface 14 of the support pad 15 while engaging pad during ingress or egress through the access port 24.

As in the first implementation, the support pad 15, in the second implementation as shown, has a front lip 32 extending beyond front surfaces 13a and 13b of the base portions 12a and 12b and is configured to engage a top edges 34 of the end flange 30 providing not only addition comfort for the mechanic by avoiding potential contact with the flange but assistance in locking the ergonomic aid 10 in place on the stringer 28. For the implementation shown, the front lip 32 has a depth at least covering the top edge 34. Base portions 12a and 12b incorporate reliefs 38a and 38b to be received over the base flange 36. Reliefs 38a and 38b also provide additional assistance in locking the ergonomic aid 10 in place on the stringer 28. the thickness 40a, 40b of the base portions 12a and 12b may be predetermined to cause frictional engagement (and possible slight compression) between front surfaces 42a and 42b of the base portions 12a and 12b, respectively, and the end flange 30 of the stringer 28 and the reliefs 38a and 38b and the base flange 36, if present, and/or a rear surface 44 of the base portions 12a and 12b and the partition 20.

Channel 50 accommodates protuberance 52 on the web 26 of stringer 28. The width of channel 50 is predetermined to be received over the protuberance 52 and side surfaces 54a and 54b of the channel 50 may have angles 56a, 56b relative to vertical to provide additional clearance. Similarly, lateral end surfaces 58a and 58b of the base portions 12a and 12b may have angles 60a, 60b relative to vertical to provide clearance for additional protuberances in the stringer.

Central portion 62 of the support pad 15 spans the channel 50 and has a predetermined height 64 not less than 0.50 inches to provide sufficient structural support for the support pad 15 to avoid excessive deformation.

In the exemplary implementations, the ergonomic aid 10 is fabricated from thermoplastic material to provide predetermined compressibility for support pad 15 and for engaging the front and rear surfaces 42, 44 between the end flange 30 and base flange 36 and/or partition 20. Compression of the support pad 15 and base portion 12 (or base portions 12a, 12b) vertically may provide expansion in the thickness to enhance frictional contact with the end flange and base flange to "lock" the ergonomic aid in place. In certain implementations Acrylonitrile butadiene styrene (ABS), specifically ABS-M30 available from Stratasys, Ltd. Alternatively, ULTEM 9085 may be employed.

Figure 8:
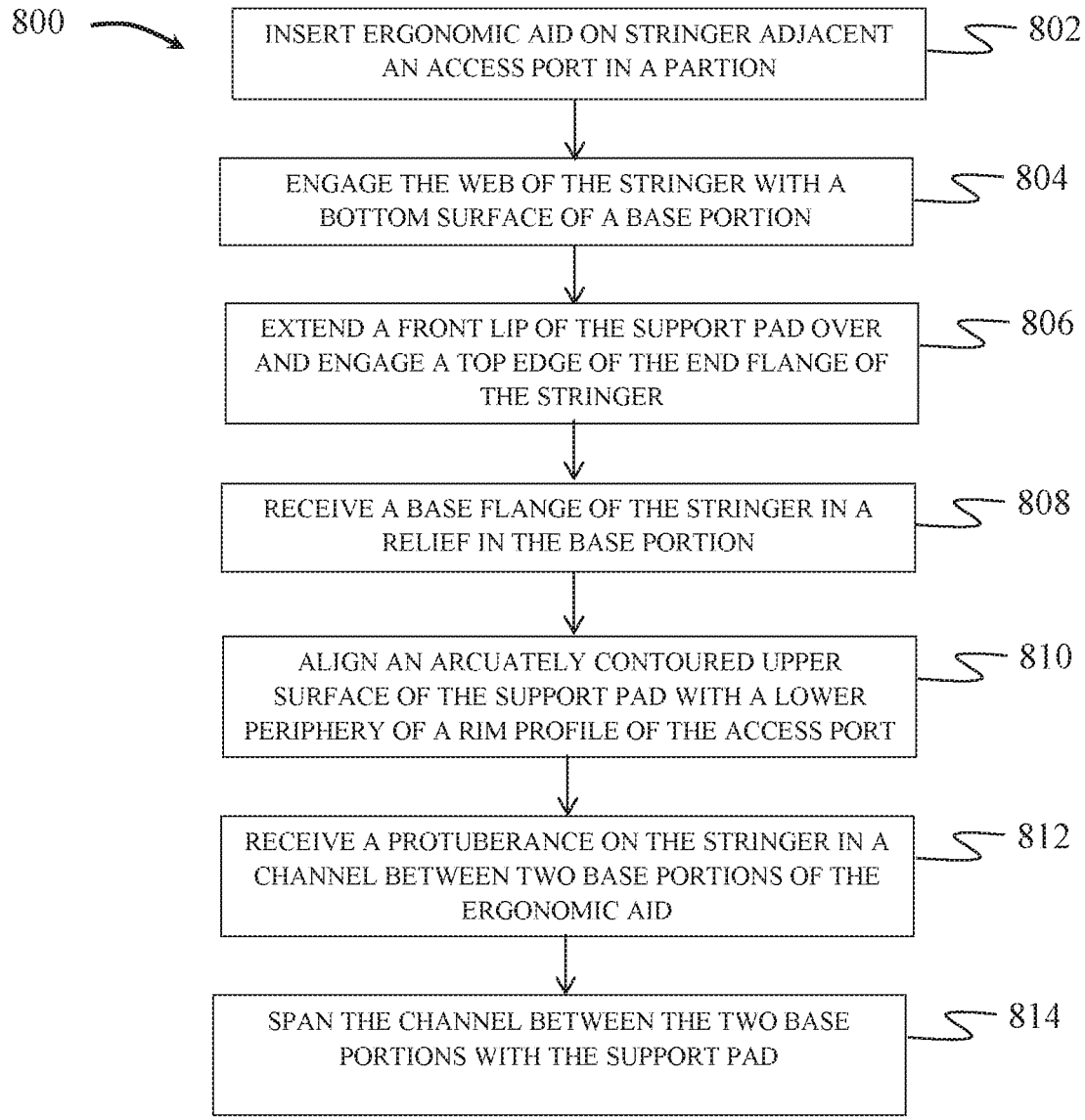
FIG. 8. is a flow chart showing a method for installation and use of an ergonomic aid for access port passthrough.

The implementations described herein provide a method 800 for installation and use of an ergonomic aid for access port passthrough as shown in FIG. 8. An ergonomic aid 10 is inserted on a stringer 28, step 802, with a bottom surface 16 of a base portion 12 engaging a web 26 of the stringer, step 804. A front lip 32 of a support pad 15 extends over and engages a top edge 34 of an end flange 30 of the stringer, step 806. A base flange 36 of the stringer is received in a relief 38 in the base portion 12, step 808. An arcuately contoured upper surface 14 of the support pad 15 extending from the base portion 12 is aligned with a lower periphery of a rim profile 22 of an access port 24, step 810. The base portion of the ergonomic aid may incorporate two base portions 12a, 12b and a channel 50 between the two base portions may receive a protuberance 52 on the stringer 28, step 812, with the support pad spanning the channel, step 814.

Figure 9:
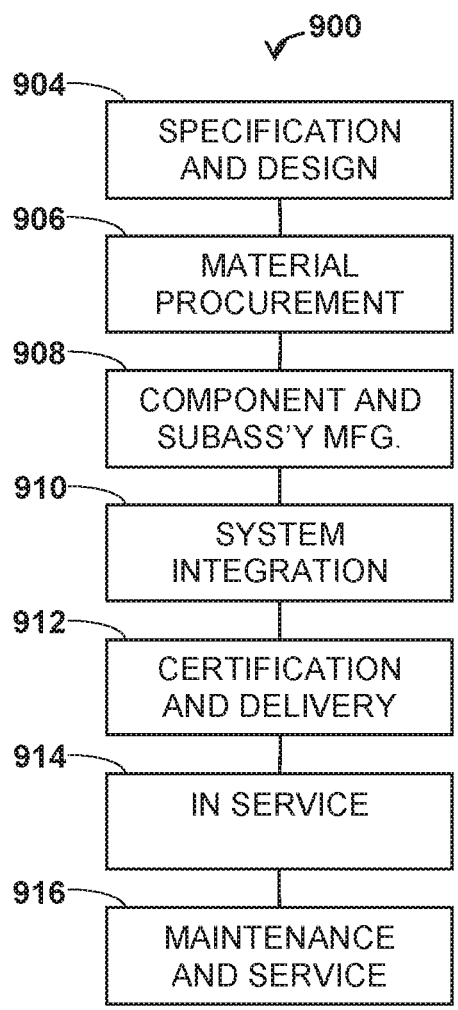
FIG. 9 is a flow diagram of aircraft production and service methodology.
Figure 10:
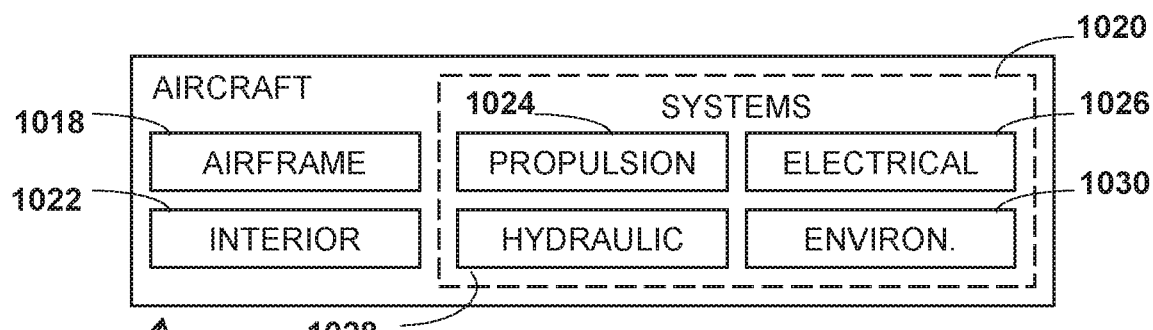
FIG. 10 is a block diagram of an aircraft.

Referring FIGS. 9 and 10, implementations of the disclosure herein may be described in the context of an aircraft manufacturing and service method 900 as shown in FIG. 9 and an aircraft 1000 as represented in FIG. 10. During pre-production, exemplary method 900 may include specification and design 904 of the aircraft 1000 and material procurement 906. During production, component and subassembly manufacturing 908 and system integration 910 of the aircraft 1000 takes place. Thereafter, the aircraft 1000 may go through certification and delivery 912 in order to be placed in service 914. While in service by a customer, the aircraft 1000 is scheduled for routine maintenance and service 916 (which may include modification, reconfiguration and refurbishment).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity or service organization.

As shown in FIG. 10, the aircraft 1000 produced by exemplary method 900 may include an airframe 1018, incorporating the structures such as the wing structures described herein, and a plurality of systems 1020 and an interior 1022. Examples of high-level systems 1020 include one or more of a propulsion system 1024, an electrical system 1026, a hydraulic system 1026, and an environmental system 1030.

Implementations and methods described herein may be employed during any one or more of the stages of the production and service method 900. For example, wing subassemblies corresponding to production process 908 may be fabricated or manufactured in a manner similar maintenance performed on wings while the aircraft 1000 is in service. Also, one or more implementations, methods, or a combination thereof may be utilized during the production stages 908 and 910, for example, by substantially expediting assembly of or reducing the cost of an aircraft 1000. Similarly, one or more of apparatus implementations, methods, or a combination thereof may be utilized while the aircraft 1000 is in service, for example and without limitation, for maintenance and service 916.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. An ergonomic aid comprising:
   a base portion received on a stringer adjacent an access port in a partition wall within a structural enclosure; and,
   a support pad extending from the base portion, said support pad having an upper surface with a contour configured to match a profile of the access port said support pad having a predetermined height matching the upper surface with a rim of the access port opening when said support pad is in a compressed condition, the support pad further comprising a lip extending beyond a front surface of the base portion to engage a top edge of an end flange of the stringer.

2. The ergonomic aid as defined in claim 1 wherein the base portion has a predetermined thickness to be received against a web of the stringer between a base flange and end flange of the stringer.

3. The ergonomic aid as defined in claim 1 wherein the ergonomic aid has a predetermined height placing the upper surface of the support pad in an uncompressed condition at a clearance of a minimum of 0.25 inches above the profile of the access port adjacent the support pad with the base portion engaged on a web of the stringer.

4. The ergonomic aid as defined in claim 1 wherein the ergonomic aid has a predetermined height varying over the contour whereby the upper surface of the support pad in a compressed condition is at least equal in height to a lower periphery of the access port above a web of the stringer with the base portion engaged on the web of the stringer.

5. The ergonomic aid as defined in claim 1 wherein the lip has a depth at least covering the top edge of the end flange of the stringer.

6. The ergonomic aid as defined in claim 1 wherein the support pad further comprises a front portion having a radius to facilitate sliding contact by a mechanic with the upper surface of the support pad while engaging pad during ingress or egress through the access port.

7. The ergonomic aid as defined in claim 1 wherein the base portion has a relief receiving a base flange of the stringer.

8. The ergonomic aid as defined in claim 1 wherein the support pad has a width of at least 10 inches to provide adequate support for a mechanic resting against the support pad.

9. The ergonomic aid as defined in claim 1 wherein the base portion comprises two spaced apart base portions.

10. An ergonomic aid comprising:
    two space-apart base portions, each being not more than a predetermined thickness that is sufficient to be received against a web between two flanges of a stringer that is mounted proximate an access port in a partition wall within a structural enclosure;
    a support pad extending from the two base portions and having central portion spanning the two base portions, said central portion having a predetermined minimum thickness of at least 0.50 inches,
    wherein the support pad has an arcuate upper surface with an arcuate contour that generally conforms to a rim profile of the access port, such that when the two base portions are positioned against a web between two flanges of a stringer an upper surface of the support pad is above the stringer flanges and conforms to the rim profile of the access port, wherein a lip of the support pad at least partially overlaps the top of at least one flange of the stringer.

11. The ergonomic aid as defined in claim 10 wherein the ergonomic aid has a predetermined height varying over the contour whereby the upper surface of the support pad in a compressed condition is at least equal in height to a lower periphery of the access port above a web of the stringer with the base portion engaged on the web of the stringer.

12. The ergonomic aid as defined in claim 10 wherein one of the two flanges comprises an end flange and the support pad further comprises a lip configured to engage a top edge of the end flange.

13. The ergonomic aid as defined in claim 10 wherein the support pad further comprises a front portion having a radius to facilitate sliding contact by a mechanic with the upper surface of the support pad while engaging pad during ingress or egress through the access port.

14. The ergonomic aid as defined in claim 10 wherein one of the two flanges comprises a base flange and the base portion has a relief receiving the base flange.

15. The ergonomic aid as defined in claim 10 wherein the support pad has a width of at least 10 inches to provide adequate support for a mechanic resting against the support pad.

16. A method for installation and use of an ergonomic aid for access port passthrough, the method comprising:
    inserting an ergonomic aid on a stringer;
    engaging a web on the stringer with a bottom surface of a base portion; and,
    aligning an arcuately contoured upper surface of a support pad extending from the base portion with a lower periphery of a rim profile of an access port.

17. The method as defined in claim 16 further comprising extending a front lip over and engaging a top edge of an end flange of the stringer.

18. The method as defined in claim 16 further comprising receiving a base flange of the stringer in a relief in the base portion.

19. The method as defined in claim 16 wherein the base portion comprises two base portions separated by a channel and further comprising receiving a protuberance on the stringer in the channel.

20. The method as defined in claim 18 further comprising spanning the channel with the support pad.

* * * * *